Aug. 7, 1928.
R. E. SLADE ET AL
1,679,792
PROCESS OF REMOVING AMMONIA FROM SYNTHESIS GASES
Filed Jan. 28, 1926
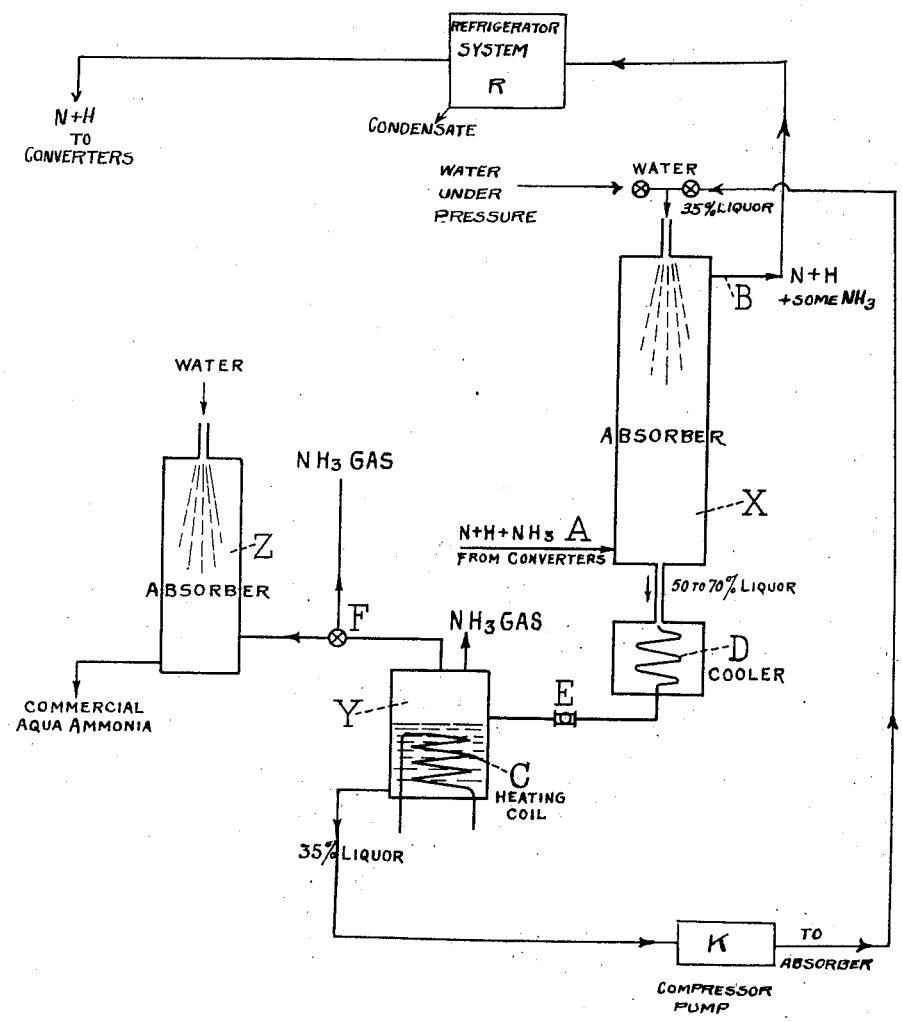
WITNESS
*G. V. Rasmussen*
INVENTORS
ROLAND E. SLADE
KENNETH GORDON
BY
ATTORNEYS Patented Aug. 7, 1928.

1,679,792

UNITED STATES PATENT OFFICE.

ROLAND EDGAR SLADE, OF BILLINGHAM-ON-TEES, AND KENNETH GORDON, OF STOCKTON-ON-TEES, ENGLAND, ASSIGNORS TO ATMOSPHERIC NITROGEN CORPORATION, OF SOLVAY, NEW YORK, A CORPORATION OF NEW YORK.

PROCESS OF REMOVING AMMONIA FROM SYNTHESIS GASES.

Application filed January 28, 1926, Serial No. 84,322, and in Great Britain January 30, 1925.

This invention relates to that stage of the synthetic ammonia art where the ammonia produced in the catalytic converter is to be removed from the gases as the product of the synthesis system. The object of the invention is to effect an efficient removal of ammonia in an economical manner. Heretofore the generally known methods applicable to the removal of ammonia were:

(1) Separation of the ammonia as anhydrous liquid ammonia, and (2) Separation as an aqueous solution of ammonia.

Each of these methods has its particular advantages and disadvantages.

The first method requires special and costly refrigerative apparatus, but on the other hand it furnishes a very convenient product, both as regards handling and as an excellent source of gaseous ammonia. The removal of practically the whole of the synthetic ammonia as an aqueous solution on the other hand requires the injection into the system of quantities of high pressure water, since the gases to be treated are generally under the original high catalysis pressure. The strongest solution that is stable at ordinary temperatures and pressures contains 35% $NH_3$. In such a solution the ammonia is in a relatively dilute state, but nevertheless this liquid finds adequate applications, for example, in the manufacture of ammonium salts, which is generally conducted in solution.

Now according to the present invention it is possible to obtain various advantages of each of these two methods of separating ammonia from gaseous mixtures, and at the same time to effect notable economies in the cost of operation. To this end we subject the gases charged with freshly synthesized ammonia to the action of a stream of high pressure water, but we limit the amount of high pressure water to such an extent that a liquor is produced which contains approximately 50% of ammonia ($NH_3$) or over, up to say 70% $NH_3$. In this way we can effect a saving of over 50% of the cost of injecting the necessary water. The liquor is collected while still under high pressure, and then run into a special let-down vessel through reducing valves. In this vessel the pressure is atmospheric, and consequently on suffering the drop in pressure the strong liquor made under the original high pressure of the gases evolves gaseous ammonia and is reduced in strength to about 35%, the partial pressure of $NH_3$ over such liquor being one atmosphere. The ammonia gas evolved is practically 100% $NH_3$, and as such is amenable to a variety of treatments.

Ammonia is often required in the gaseous form, for instance, for mixing with air prior to oxidation to nitrogen oxides and the subsequent preparation of nitric acid. The ammonia gas thus developed may conveniently be used in this way. On the other hand, if all the ammonia is needed as aqueous solution the gas can be sent to an absorption tower, where it can be entirely absorbed under atmospheric pressure. Finally, the quantity of water used for this absorption may be regulated so as to permit of making liquor of any desired strength, and the 35% liquor made in the let-down vessel may be mixed therewith if desired.

Alternatively, we may dilute the strong solution by water without allowing substantial escape of ammonia gas, e. g. by running the high pressure solution into a body of water at atmospheric pressure.

By making in the absorption tower a liquor of 50% strength or over it might be thought that an excessive amount of ammonia would escape with the nitrogen-hydrogen mixture, and so return through the catalytic cycle; and generally speaking it is desirable that not more than 0.5% of ammonia shall return to the converters, since if more than this quantity of ammonia is present at the start in the synthesis gases the net make of ammonia in the system suffers. It is striking, however, that when making 50% liquor the amount of ammonia escaping from the absorption tower (in which the gas mixture is passed counter-current with the liquor) is only about 0.3% of the total gas mixture when, for example, a pressure of 200 atmos. is used in the tower.

The accompanying drawing illustrates one method of carrying out our process. Ammoniacal gases from the converters pass through A into the bottom of an absorption tower X into which high pressure water or other suitable aqueous medium is injected from the top. The quantity of water is so regulated that an ammonia liquor of about 50% strength is formed, and under those conditions very little ammonia gas escapes through B along with the unchanged nitrogen and hydrogen. Owing to exothermic heat of solution of the ammonia gas the liquor formed in X is warm and if it is desired subsequently to produce in Y as little ammonia gas as possible i. e. when the ammonia is required as solution only, the liquor flowing from X may be cooled in coil D. Suitable external or other cooling means may also be provided for the tower X when required. When it is intended to make ammonia gas for direct use as such the cooling at D is, of course, omitted, for the production of gas is favored by a higher temperature. The liquor passes through a reducing valve or valves E into the let-down vessel Y, where ammonia gas boils off and is led away by the pipe F, either to be used directly as gas or to a further absorption tower Z operated under atmospheric pressure. As the gas boils away from the liquor entering Y the temperature of the system drops, and the evolution of $NH_3$ slows down. Consequently, if more gas is required heat must be supplied to the cold liquor. The absorption of heat from E to Y is the exact counterpart of the heat evolved in the tower X and therefore the liquor in Y could be maintained at the normal temperature by utilizing this source of heat, but it is more convenient to arrange the heating of Y, if necessary, by means of a steam heated coil C. If then Y is maintained at the ordinary temperature the liquor remaining therein will be about 35% $NH_3$ and of the total ammonia absorbed in X the liquor will represent about half, while the gas leaving Y constitutes the remainder. Even if no heating of Y is resorted to there will still be evolved as gas about 10% of the total ammonia, and 90% of the total ammonia remains in solution under atmospheric pressure, and of course at a reduced temperature. This liquor may be mixed with water to make any desired strength of liquor, which, in general will be below 35% since over stronger solutions than this the pressure of ammonia exceeds one atmosphere.

In referring to the use of water for washing the gases we desire to include the use of ammonia liquors containing less ammonia than 50%, for example, the liquor of about 35% strength from the vessel Y. This liquor may be used for scrubbing the gases in absorber X, and when thus used, is pumped from tank Y to absorber X by means of compressor pump K.

The scrubbed gases require to be dried before they are again submitted to catalysis and we may therefore arrange that these gases, still containing say 0.3% $NH_3$ (or over) are subjected to refrigeration in refrigerator system R at a temperature below 0° C. so that the moisture is removed in liquid form as a solution of ammonia; very complete drying can be effected in this way by using a sufficiently low temperature.

From the refrigerator system R the gases not condensed by refrigeration temperature and consisting of nitrogen and hydrogen in relation of 1:3, and still under pressure, are introduced into a converter whose product may then be flowed into the absorber X via the inlet A. At the same time there also passes through the converter fresh synthesis gas which has not yet passed through the absorber X. In this way the absorber X is constantly receiving a mixture of converter gas, a part of which represents gases which have passed through the absorber X, while another part represents gases similarly constituted, but entering the absorber X for the first time.

It will be apparent that when the absorber is fed with an aqueous medium from the tank Y as heretofore described, the aqueous portion of said medium or solution is continuously circulated through the scrubbing operation as the aqueous component of the scrubbing agent, while ammonia which is absorbed in said medium as the result of the scrubbing operation, is being continuously removed from the medium by the operation conducted in tank Y which is located in the circulatory system connecting the absorber outlet with its inlet for aqueous medium.

Having now particularly described and set forth the nature of our said invention and in what manner the same is to be performed, we claim:

1. The process of removing ammonia from compressed synthesis gases which consists in scrubbing the gases at high pressure with an aqueous medium in limited amount so as to form a solution containing from about 50% to 70% of ammonia ($NH_3$).

2. The process of removing ammonia from compressed synthesis gases which consists in scrubbing the gases from the catalytic converter with an aqueous medium to give a solution of approximately 50% or higher strength leaving a small quantity of ammonia in the scrubbed gases, cooling the gases by refrigeration below 0° C., separating the condensate and subjecting the residual gases to catalytic conversion.

3. In the synthetic ammonia art the process which consists in scrubbing compressed synthesis gases during their passage from one catalytic conversion treatment to a further catalytic conversion treatment with an aqueous medium in limited amount, so as to form a solution of approximately 50% or higher ammoniacal strength, treating the said solution for the removal of a portion of the ammonia contained therein, and circulating the resultant liquor of said step as the aqueous medium of the first mentioned scrubbing step.

4. The process as set forth in claim 2 so carried out that the aqueous portion of the solution mentioned in claim 2 is continuously circulated through the scrubbing operation as the aqueous component of the scrubbing agent, while ammonia absorbed in said medium by the scrubbing operation is continuously removed from said medium in the circulatory system which connects the absorber outlet with its inlet for aqueous medium.

5. The process of recovering ammonia from compressed synthesis gases which consists in scrubbing the gases from the catalytic converter with an aqueous medium to give a solution of approximately 50% or higher strength, leaving a small quantity of ammonia in the scrubbed gases, treating the said solution for the removal of a portion of the ammonia contained therein, circulating the resultant liquor of said step as the aqueous medium of the first mentioned scrubbing step, leading the scrubbed gases containing a small quantity of ammonia as aforesaid through a zone refrigerated below 0° C., separating the condensate, subjecting the residual gases, together with gases similarly constituted, to catalytic conversion under pressure, leading the resultant compressed synthesis gases through the first mentioned scrubbing step and repeating the aforesaid operations.

ROLAND EDGAR SLADE.
KENNETH GORDON.